Nov. 21, 1939.  D. DYRESEN  2,180,925
FASTENER MEMBER
Filed Oct. 9, 1937
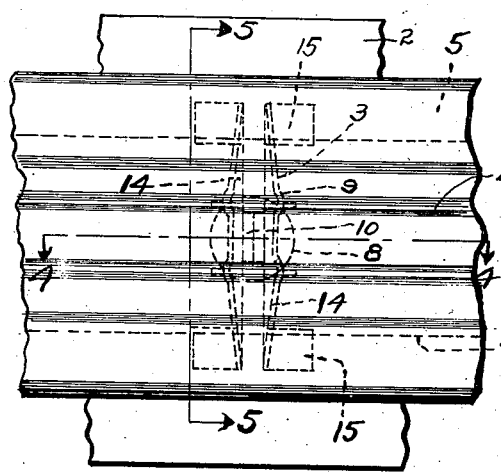
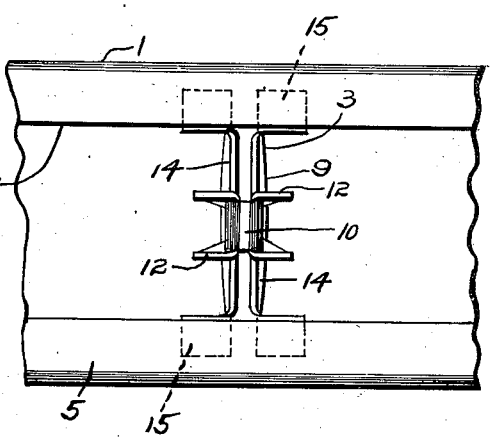
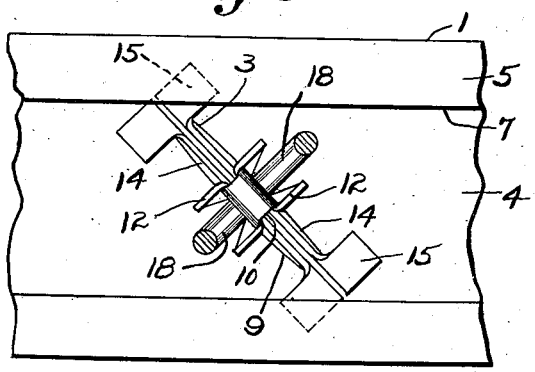
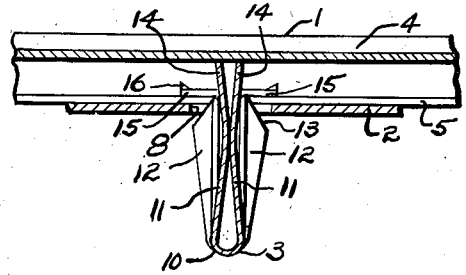
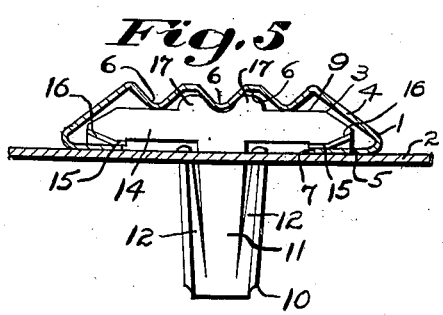
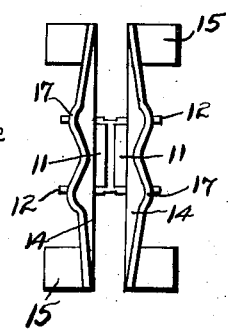
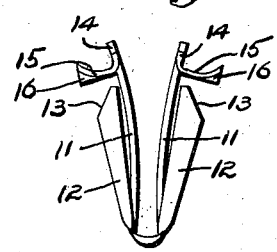
Inventor:
Didrick Dyresen.
By Walter S. Jones Att'y.

Patented Nov. 21, 1939

2,180,925

UNITED STATES PATENT OFFICE 2,180,925

FASTENER MEMBER

Didrick Dyresen, Billerica, Mass., assignor to United-Carr Fastener Corporation, Cambridge, Mass., a corporation of Massachusetts Application October 9, 1937, Serial No. 168,244

4 Claims. (Cl. 189—88)

My invention relates to snap fastener members of the type designed for fastening two apertured bodies together and installations of the same.

In the drawing, in which I have illustrated a preferred embodiment of my invention:

Figure 1 is a front elevation of a molding strip secured to a supporting structure with my improved fastener member shown in dotted lines;

Fig. 2 is a rear elevation of a molding strip with my improved fastener member assembled therewith;

Fig. 3 is a view similar to Fig. 2 showing the manner in which my fastener member is engaged with the molding strip;

Fig. 4 is a section taken along the line 4—4 of Fig. 1;

Fig. 5 is a section taken along the line 5—5 of Fig. 1;

Fig. 6 is a top view of my fastener member per se; and

Fig. 7 is an end view of my fastener member per se.

My invention, as illustrated in the accompanying drawing, relates specifically, though not exclusively, to a fastener secured installation in which a hollow body, such as a molding strip and the like, is quickly and easily attached to a supporting structure, such as the frame of an automobile, by means of my improved fastener member.

The particular installation which I have chosen for the purpose of illustrating my invention includes a hollow sheet metal strip 1 secured to a supporting structure 2 by means of my improved separable fastener member 3. The molding strip 1 is of the type commonly used for ornamenting exterior surfaces of an automobile body and has an outer side 4 and an inner side 5 spaced from the outer side. At least a portion of the outer side 4 may be provided with corrugations 6 extending, in my preferred form, longitudinally of the strip and having a cross-sectional shape substantially as shown in Fig. 5. The inner side 5 has an opening 7 running longitudinally thereof and the supporting structure 2, which is preferably of thin metal material, has an aperture 8 therein to receive a stud means of the fastener 3.

Referring to my preferred form of fastener member, I have shown a fastener member of simple construction which is formed from one piece of spring metal. The fastener member 3, in my preferred construction, comprises a base portion 9 adapted to be seated within the hollow body of the molding strip 1 and a stud means 10 extending beneath the base 9 for passage through the aperture 8 of the supporting structure to secure the strip 1 to the support. The stud means 10 may be of any suitable construction, but in my preferred form I have shown one having a pair of oppositely-disposed yieldable legs 11—11 (Figs. 4 and 7) connected at their ends and wing portions 12 integrally joined to said respective legs near said connected ends. The wing portions 12 are provided with shoulders 13 at their free ends (Figs. 4 and 7) facing the base 9 and adapted to engage material of the supporting structure 2 adjacent the aperture 8. The base 9, the construction of which is the chief feature of my present invention, comprises a pair of arms 14—14 integrally joined at substantially their mid-portions to respective free ends of the legs 11—11 so that each leg, together with the respective arm 14, forms a substantially T-shaped portion, as most clearly shown in Fig. 5. The arms 14—14 are normally separated from each other with inner broad surfaces of the arms substantially facing each other, as most clearly shown in Fig. 6. As a means for securing the base 9 to the hollow molding, each of the arms has a pair of ear-shaped attaching portions 15 disposed at opposite ends of the arm and extending laterally from the lower edges thereof. A corner 16 of each of the attaching portions 15 may be bent up as shown in Figs. 5 and 7 so that diametrically opposed attaching portions 15 may ride over the edges of the inner side 5 of the strip 1 adjacent the opening 7 should there be any interference between the parts during entrance of the base 9 through the opening 7 for attaching the fastener to the molding strip. On each of the upper narrow edges of the arms 14—14 I have preferably provided a pair of raised portions 17—17 (Figs. 5 and 6). The raised portions 17—17 are substantially complementary in contour to the cross-sectional shape of the corrugated portion of the outer wall 4 of the molding strip and are adapted to be received by the corrugations 6 when the base of the fastener member is in final assembly with the strip so as to provide a more secure assembly between the parts.

Assembly of my fastener member with the molding strip 1 is a relatively simple matter and is carried out through first pinching the arms 14—14 substantially together so as to contract the arms against the spring action provided by the connected legs 11—11 of the stud means 10. This contraction of the arms 14—14 may be carried out by any suitable tool means, such as a plier-like member, having oppositely-disposed arms 18—18 engaging opposite broad surfaces of the arms 14—14, as most clearly shown in Fig. 3. This action raises the attaching portions on the respective arms 14—14 so that diametrically opposed attaching portions on the respective arms may normally clear the edges of the inner side 5 adjacent the opening 7 during entrance of the arms through the opening 7. Next, the base of the fastener member is preferably positioned longitudinally of the opening 7 of the strip 1 and then turned so that the arms 14—14 are finally disposed within the hollow body of the molding in transverse relation to the major axis of the opening 7. After the base 9 has been disposed in final position within the molding, pressure on the arms 14—14 for holding them together is released so that the arms 14—14 expand to engage outermost edges of the attaching portions 15 with the inner side 5 of the molding whereby the base is securely seated within the hollow strip. At the same time, the raised portions 17 of the arms 14—14 cooperate with the corrugations 6 of the outer side 4 in the manner most clearly shown in Fig. 5 to aid in preventing relative play between the parts. The molding strip may now be secured to the supporting structure 2 through snapping the stud means 10 of the fastener member through the aperture 8 of the support so as to engage the shoulders 13—13 of the stud means behind the support (Fig. 4) in a manner well known in the art. It should be understood in connection with my preferred method of attaching the fastener to the molding, hereinabove described, that the fastener may also be assembled with a molding by pinching the arms together and then moving them through an open end of said molding longitudinally of said molding. Although I have shown only one fastener member secured to the molding strip 1, it is understood that as many fastener members may be provided as are necessary for securing the molding to the support.

Thus by my invention I have provided a fastener member of simple construction which may be quickly and easily assembled with a molding strip or the like part so as to secure the strip to a supporting structure.

Although I have illustrated and described a preferred embodiment of my invention, I do not wish to be limited thereby because the scope of my invention is best defined by the following claims.

I claim:

1. A fastener installation comprising, in combination, a hollow part having an elongated opening in an inner side thereof and a fastener member rotatably secured to said part through the opening of said inner side, said fastener member having a base seated within said hollow part and yieldable legs extending through said opening and having means for attaching the part to a support, said base comprising a pair of substantially vertical arms having laterally-extending horizontal attaching portions, a spring means forming a part of said fastener member and normally maintaining said arms in spaced relation, said arms being disposed within said hollow part in transverse relation to the major axis of said opening, and said attaching portions being in spring engagement with the material of said inner side of said hollow part adjacent said opening to secure said fastener member to said hollow part.

2. A fastener installation comprising, in combination, a hollow part having an elongated opening in an inner side thereof and a fastener member rotatably secured to said part through the opening of said inner side, said fastener member having a base seated within said part, and a pair of yieldable legs extending beneath said base, said legs being connected at their ends away from said base and having means for attaching said part to another member, said base comprising a pair of arms integral with the free ends of said legs, said arms being movable toward each other against the spring tension set up in said legs, said arms being disposed within said hollow part in transverse relation to the major axis of said opening with the broad surfaces of said arms substantially in perpendicular relation to the plane of said inner side, and a yieldable ear-shaped attaching portion extending from adjacent at least one free end of each of said arms in substantially perpendicular relation to the plane of the broad surfaces of said respective arm, said attaching portions being in spring engagement with said inner side adjacent opposite longitudinal sides of said opening for securing said fastener to said part.

3. A fastener installation comprising, in combination, a hollow molding strip having an inner side and an outer side spaced from said inner side, said outer side having corrugations extending lengthwise thereof, said inner side having an elongated opening therein, said fastener member having a base seated within said molding strip and yieldable legs extending through said opening and having means for attaching the strip to another member, said base comprising a pair of independent arms disposed within said molding in transverse relation to the major axis of said opening with the planes of the broad surfaces of said arms in substantially perpendicular relation to the plane of said inner side, the upper narrow edge of at least one of said arms having a raised portion substantially complementary in contour to at least a portion of the corrugated portion of the outer side of said molding, and said arms having attaching portions engaging said inner side adjacent said opening for securing said fastener to said molding.

4. A fastener member comprising a base adapted to be seated within a hollow part and a pair of yieldable spaced apart legs of substantial length extending beneath said base, said legs being connected at their ends away from said base and having yieldable means for snap fastener engagement through an aperture in another member by direct axial movement, said base comprising a pair of arms integral with the free ends of said respective legs, said arms being movable toward each other against the spring tension set up by said legs and each of said arms having at least one attaching portion extending laterally therefrom in a plane normal to the axis of the fastener for engagement with a portion of said hollow part for securing said fastener member to said part, and said attaching portion having a bent up portion acting as a cam during attachment of the base within the hollow part by rotation after insertion.

DIDRICK DYRESEN.